United States Patent [19]

Destito

[11] 4,143,496
[45] Mar. 13, 1979

[54] WALL DECORATING DEVICE

[76] Inventor: Joseph Destito, 17 Saxon Dr., Valhalla, N.Y. 10595

[21] Appl. No.: 858,947

[22] Filed: Dec. 9, 1977

[51] Int. Cl.² .......................... E04C 2/20; E04F 13/00
[52] U.S. Cl. .................................... 52/173 R; 52/385; 52/391; 52/511; 273/282; 273/293; 428/40; 428/47
[58] Field of Search .......................... 428/40, 47–49, 428/41, 53–194, 45; 52/173 R, 385–391, 511; 156/63–71; 273/282, 292, 293

[56] References Cited

U.S. PATENT DOCUMENTS

| | | | |
|---|---|---|---|
| 3,135,647 | 6/1964 | Wheeley | 428/40 |
| 3,174,753 | 3/1965 | Miller | 273/282 X |
| 3,242,594 | 3/1966 | Smith | 428/16 X |
| 3,270,473 | 9/1966 | Smith | 52/385 X |
| 3,504,466 | 4/1970 | Herzog | 52/511 X |
| 3,785,655 | 1/1974 | Babb | 273/292 |
| 3,833,222 | 9/1974 | Castanis | 273/156 |
| 3,956,838 | 5/1976 | Gerrish | 428/14 X |
| 3,962,504 | 6/1976 | Sherwin | 428/49 X |

*Primary Examiner*—Henry F. Epstein
*Attorney, Agent, or Firm*—Barnwell R. King

[57] ABSTRACT

A flat rectangular holding frame member is provided on one side with adhesive tape adjacent the edge thereof, which is covered by a peel-off film which, upon removal, allows the frame to be applied to the surface of a wall for adherence thereto; and on the other side, is provided with snap fastener means for removably holding a flat, domino decoration-bearing rectangular face member which is similar in size and shape to that of the frame member, having mating snap fastener means on the back thereof, in place thereon, so that a wall decorated with a plurality of different domino spots, or blanks, can be rearranged on the frame member at will without removing the frame members from the wall surface.

7 Claims, 3 Drawing Figures

WALL DECORATING DEVICE

BACKGROUND OF THE INVENTION

This invention relates to decorative wall tiles of plastic, and more particularly a wall tile device in which the decorative faces of the tiles can be rearranged at will, without removing the adhesive part thereof from the wall surface.

It is known to apply plastic tiles to a wall upon removal of a protective sheet from the back of the tile, to expose a self-sticking adhesive for securing the tile in place when applied to such wall. However, should one wish to rearrange the tiles, so applied, it is difficult, or even impossible to do so, even if one wanted to.

The main object of this invention is to solve such problem, so that tiles having different decorative faces, may be rearranged without difficulty to obtain a desired motif.

Another object is to provide means whereby tiles having different domino faces, can be easily rearranged without disturbing the adhesive which holds the tile to the wall.

SUMMARY OF THE INVENTION

A flat holding member and a flat decorative face member having the same edge shape and dimensions, are snap fastened together, and secured to a wall surface by self-sticking adhesive tape on the back of the holding member, after a protective film is peeled off of such tape. When the wall surface to be decorated is covered with such tile devices, the decorative effect may be changed to suit the motif, such as dominos with different spots, or blanks; by simply pulling the face members away from the holding members, and snapping them back on other holding numbers, as desired. The tile device for example, may simulate large (1' × 2' × ⅛") domino pieces (blocks) with six to no dots on each half face thereof.

DETAILED DESCRIPTION OF THE INVENTION

Figure 1:
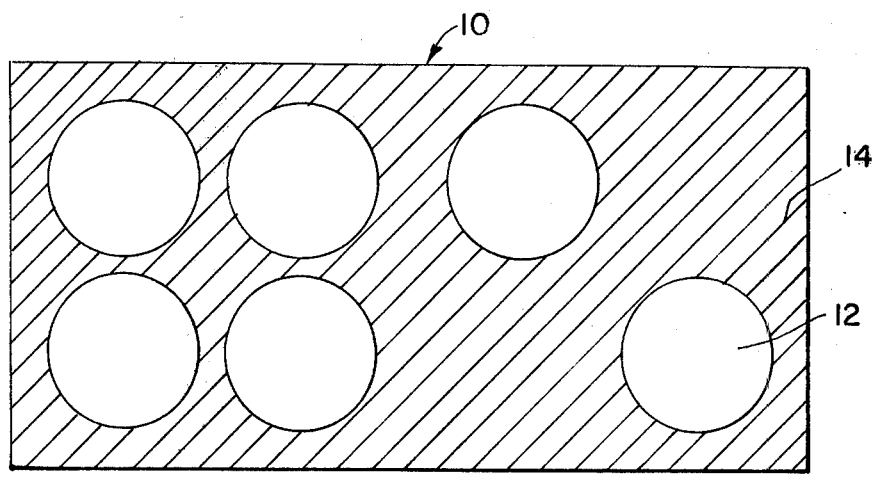
FIG. 1 is a view in front elevation of a domino wall tile device embodying the invention.
Figure 2:
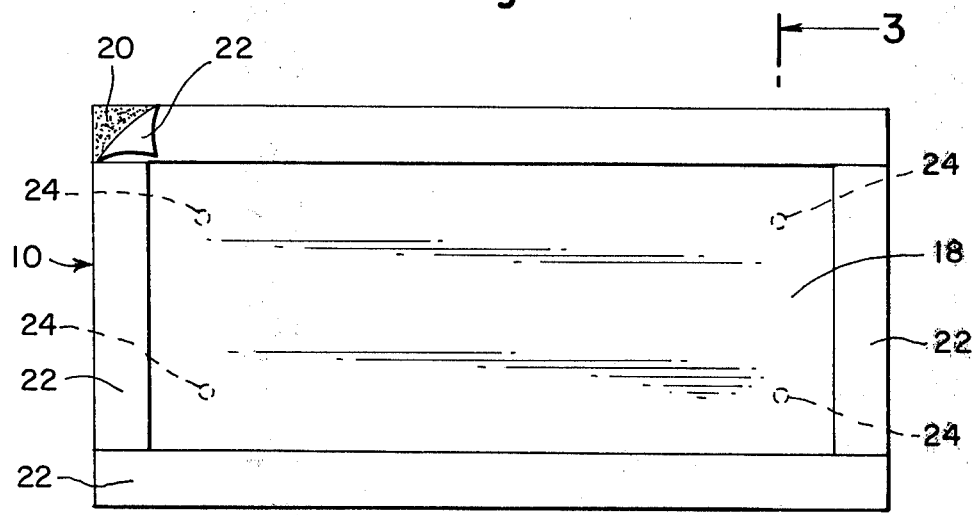
FIG. 2 is a view in rear elevation thereof.
Figure 3:
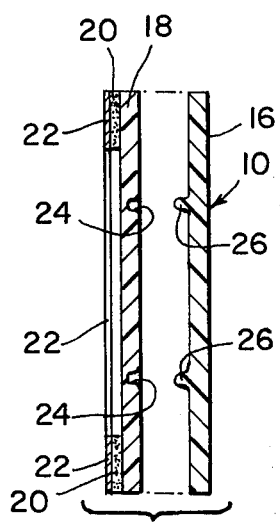
FIG. 3 is an exploded view in cross section taken on line 3—3 of FIG. 2.

Referring to the drawings, a domino wall tile 10 is provided with spots 12 in a color (or white) that contrasts with the background 14 thereof (black). Or any desired contrasting colors, such as, blue and white; all white with black spots; or blanks in any desired color, or black. The tile 10 is about 12" × 24" × ⅛" in size, and may be composed of plastic material; and comprises a flat face member 16 bearing the domino spots 12, and a flat holding member 18. The holding member 18 is provided with a frame 20 of adhesive tape adjacent the edges of the backing member for securing the tile 10 to the surface of a wall to be decorated. For such use, a film 22 of protective material is first peeled off of the adhesive tape frame 20, exposing a self-sticking adhesive on the back thereof for securing the tile 10 to such wall surface.

The tiles 10 so applied to the wall, adjacent one another, can be easily removed from their corresponding holding members 18, by virtue of releasable snap-fastening means comprising female snaps 24 in the front of holding member 18, and male snaps 26, mating therewith. Thus, the tiles 10 can be rearranged at will, without disturbing the holding members 18 on the wall. This is especially desirable where the face decorations of the tiles, are different, as in the case of domino tiles having a different number, and arrangement, of spots 12. Game domino's are provided with two halves, each containing zero to six dots, or both halves are blank; and the tile faces simulate game dominoes; providing a domino wall decor.

I claim:

1. A wall decorating tile device comprising
   a rectangular holding member,
   a frame of adhesive tape on the back of said member adjacent the edges thereof,
   a peel-off film on said tape, which is removable so that said holding member can be secured to a wall, by said tape,
   a rectangular decorative face member similar in size and shape to that of said holding member, and
   snap fastener means removably connecting the back of said rectangular face member to the front of said rectangular holding member.

2. A wall decorating tile device as defined by claim 1, in which
   said members are flat, oblong rectangles composed of plastic material, forming
   a tile about 12" × 24" × ⅛" in size.

3. A wall decorating tile device as defined by claim 2, in which
   the faces of said tiles are different, and
   by virtue of said snap fastener means, said face members can be rearranged on different holding members, as desired, without removing said holding members from the wall.

4. A wall decorating tile device as defined by claim 3, in which
   a plurality of said tiles are applied to a wall surface, comprising domino simulating faces having different numbers of spots on contrasting backgrounds, adjacent one another.

5. A wall decorating tile device as defined by claim 4, in which
   some of such faces are blanks, and
   others have spots of a different color than the backgrounds.

6. A wall decorating tile device as defined by claim 4, in which
   the spots are white, and the backgrounds are black.

7. A wall decorating tile device as defined by claim 4, in which
   the spots are black and the backgrounds are white.

* * * * *